(12) United States Patent
Ericsson et al.

(10) Patent No.: US 8,534,190 B2
(45) Date of Patent: Sep. 17, 2013

(54) GARLIC PRESS

(75) Inventors: Daniel Ericsson, Stockholm (SE);
Mikael Ericsson, Hagersten (SE);
Fredrik Hanson, Johaneshov (SE);
Johan Vestberg, Stockholm (SE)

(73) Assignee: Linden International AB, Varnamo (SE)

( * ) Notice: Subject to any disclaimer, the term of this patent is extended or adjusted under 35 U.S.C. 154(b) by 287 days.

(21) Appl. No.: 12/726,900

(22) Filed: Mar. 18, 2010

(65) Prior Publication Data

US 2010/0236429 A1 Sep. 23, 2010

(30) Foreign Application Priority Data

Mar. 23, 2009 (SE) ...................................... 0900365

(51) Int. Cl.
*B30B 9/06* (2006.01)
(52) U.S. Cl.
USPC ............ 100/234; 100/98 R; 100/112; 99/495; 99/506; 99/510; 241/169; D7/666
(58) Field of Classification Search
USPC .................. 100/110, 112, 116, 125, 234, 243, 100/98 R; 99/495, 506, 508, 510; 241/169, 241/169.2, DIG. 27; D7/665, 666
See application file for complete search history.

(56) References Cited

U.S. PATENT DOCUMENTS

| 4,069,752 | A | | 1/1978 | Ahner | |
| 4,466,346 | A | | 8/1984 | Gemelli | |
| 5,101,720 | A | | 4/1992 | Bianchi | |
| 5,513,562 | A | * | 5/1996 | Moor | ............................ 100/112 |
| 5,520,105 | A | * | 5/1996 | Healy | .......................... 100/98 R |
| 5,791,237 | A | * | 8/1998 | Gibson | ............................ 99/510 |
| 6,543,344 | B1 | * | 4/2003 | Settele | ............................ 100/243 |

FOREIGN PATENT DOCUMENTS

| DE | 20303402 U1 | 9/2003 |
| WO | 02096251 A1 | 12/2002 |

OTHER PUBLICATIONS

International-Tyoe Search Report for corresponding SE 0900365-8.

* cited by examiner

*Primary Examiner* — Jimmy T Nguyen
(74) *Attorney, Agent, or Firm* — WRB-IP LLP

(57) ABSTRACT

A food press, for example a garlic press, has a first handle with an accommodation space for the food. The first handle is, via an openable pivot, connected to a second handle which has a press plate. The food press further has a comminutor unit with a perforated plate which, in a position of use, is adjacent the accommodation space and through which the food is pressed. According to the present invention, the comminutor unit is, at opposing ends, connected via a first and second non-openable pivot, to the first and the second handles, respectively. The openable pivot includes recesses on the first handle and pins, which are insertable in the recesses on the second handle.

16 Claims, 6 Drawing Sheets

GARLIC PRESS

BACKGROUND AND SUMMARY

The present invention relates to a garlic press. More generally, the present invention relates to a food press of the type.

In its most traditional form, a garlic press has a first lever arm with an accommodation space for the material which is to be pressed. This accommodation space is open in one direction and is closed by means of a grid in the other direction. The traditional garlic press further has a second lever arm which is pivotally connected to the first arm and has a press die which fits into the accommodation space and on cranking or closure of the lever arms, presses the material located in the accommodation space through the grid of the accommodation space. Such a garlic press is disclosed in U.S. Pat. No. 5,370,044.

WO 02/096251 discloses a garlic press which has an upper shank or lever arm and a lower lever arm which are pivotally connected to one another. The lower lever arm is provided with a grid and, between the two lever arms there is a second grid. The material which is to be pressed is placed between the second grid and the upper lever arm, whereafter the lever arms are cranked towards one another.

In certain embodiments, this garlic press is designed in such a manner that the components included in the garlic press may be separated from one another, either for replacement or for cleaning.

The garlic press as disclosed in WO 02/096251 may possibly be easy to clean, but does not offer reliable pressing, since the material which is to be pressed can very likely be moved sideways; in other words it is not held in position.

Another example of a garlic press is illustrated in DE 203 03 402. This garlic press has, in a conventional manner, a lower lever arm with an accommodation space for the material which is to be pressed, this accommodation space being closed in one direction by means of a grid. Further, this garlic press has an upper lever arm which is pivotally connected to the lower arm and which has a press plate by means of which the material which is to be pressed is forced down into the accommodation space and through the grid disposed there.

According to this publication, the press grids are replaceable in order to permit a greater or lesser degree of comminution of the material to be pressed.

The replaceable function of the press grids naturally implies simplified cleaning, but nevertheless, the cleaning of the press may be difficult because of the limited access to the remaining surfaces that come into contact with the material being pressed.

It is desirable to design the food press intimated by way of introduction such that it obviates the drawbacks inherent in the prior art technology. In particular, it is desirable to design the food press so that it affords an extremely effective pressing result, that the different parts of the food press are readily accessible for cleaning, that it will be ergonomically easy to handle and be of an aesthetically attractive appearance, and, in certain embodiments, permit replacement of a comminutor unit included in the food press, with a view to varying the comminution result.

According to an aspect of the present invention, a food press comprises a first portion with a first handle and an accommodation space for food which is to be pressed, a second portion with a second handle and a press plate and a comminutor unit through which the food is pressed, the comminutor unit being pivotally connected to the first portion via a first pivot and to the second portion via a second pivot, wherein the first portion is pivotally connected to the second portion via a pivot device.

BRIEF DESCRIPTION OF THE ACCOMPANYING DRAWINGS

The present invention will now be described in greater detail hereinbelow, with reference to the accompanying Drawings. In the accompanying Drawings.

DETAILED DESCRIPTION

The subject matter of the present invention will be described hereinbelow with the use of positional or directional indications. These refer to the position the press according to the present invention assumes in normal use. For example, the term 'inner' is taken to signify that end of the press according to the present invention which, in normal use. is turned in towards the user, while 'outer' is taken to signify that end of the press which is turned away from the user.

Figure 1:
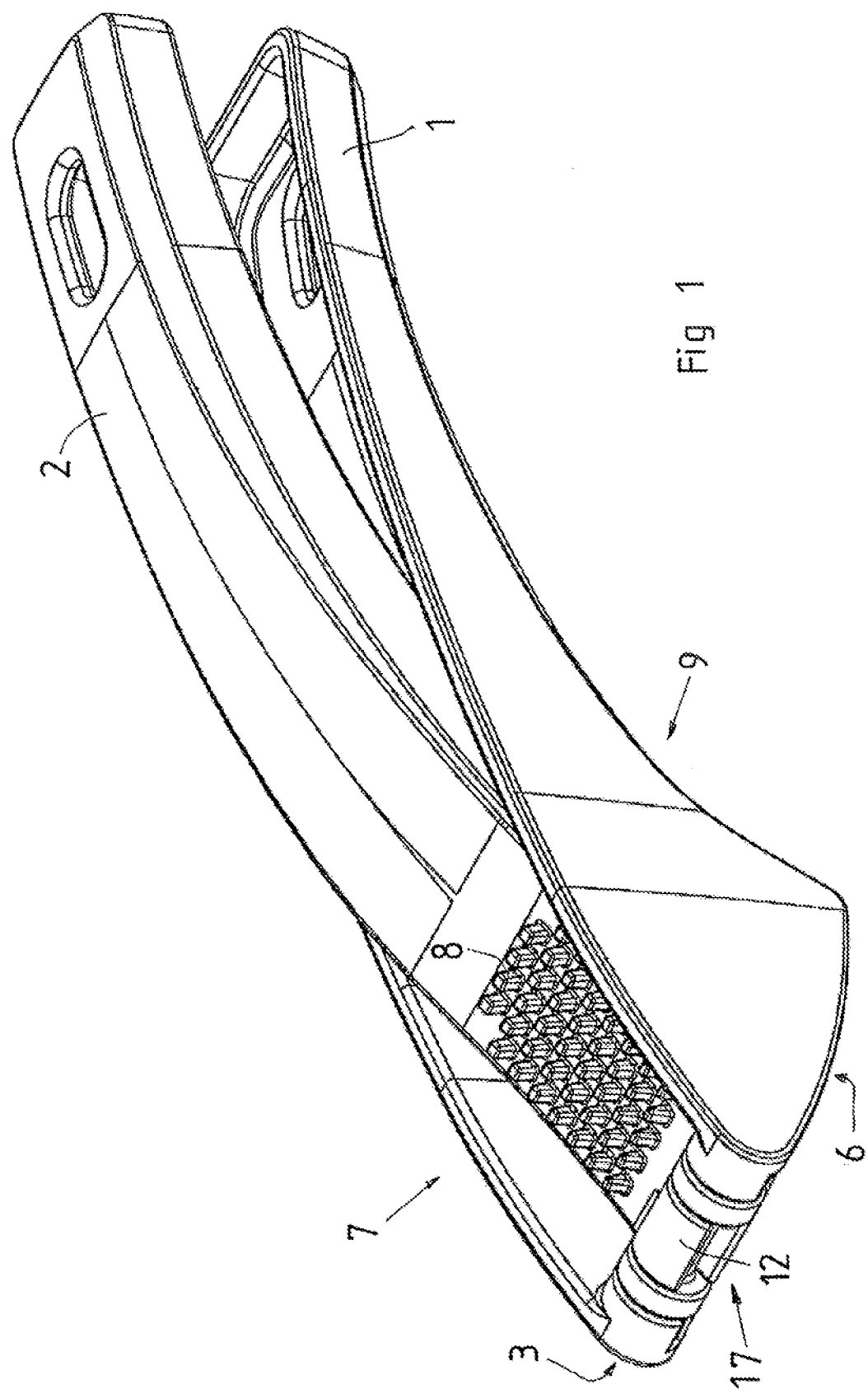
FIG. 1 is a perspective view obliquely from above of the food press according to the present invention in the final phase of a pressing operation.
Figure 2:
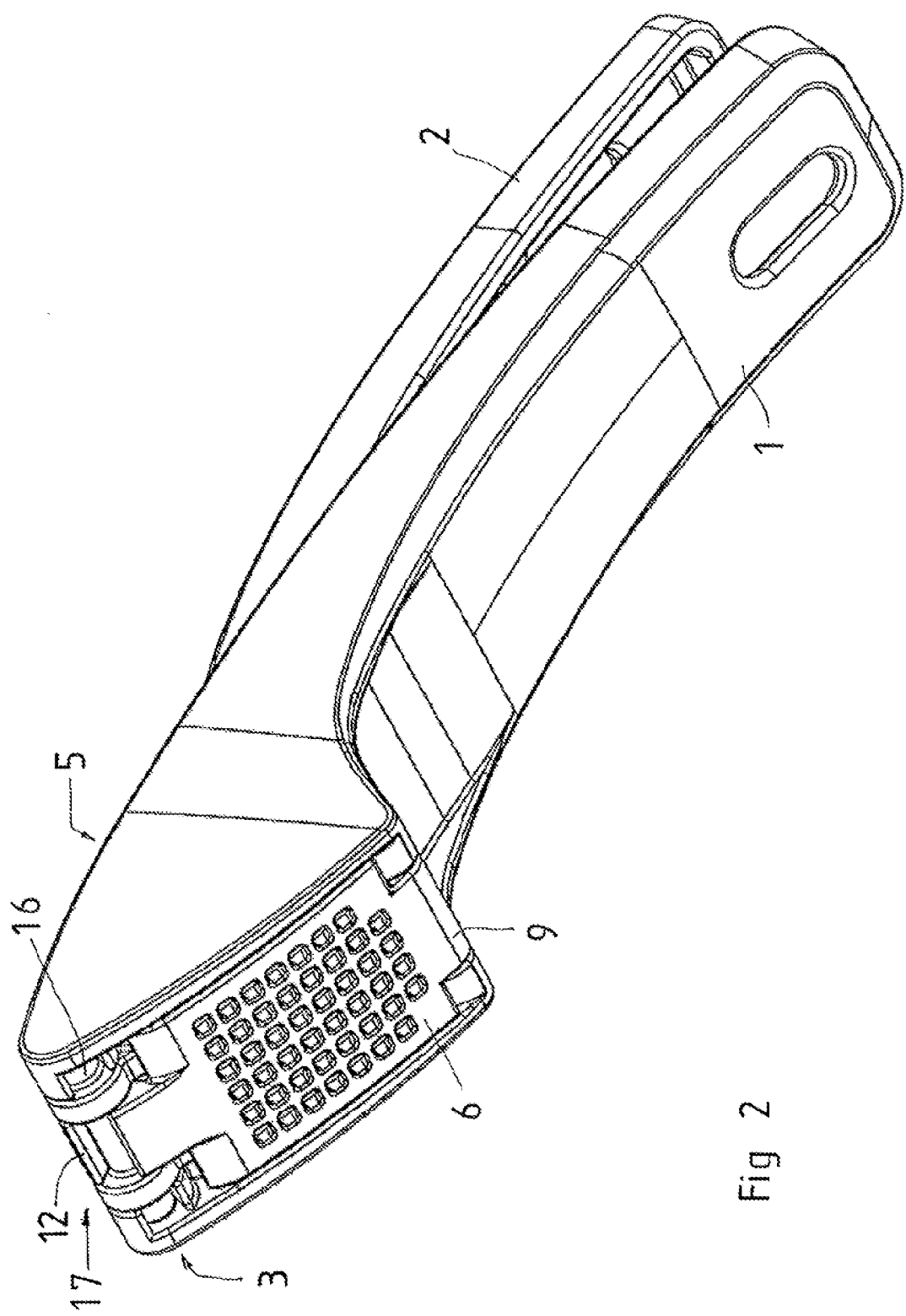
FIG. 2 shows the food press according to FIG. 1 in perspective obliquely from beneath.

It will be apparent from FIGS. 1 and 2 taken together that the food press comprises a lower or first portion 1 or lever arm, and an upper or second portion 2 or lever arm, which on use of the food press, are interconnected to one another via a pivot device 3. The lower portion 1 and the upper portion 2 can, as will be apparent from the foregoing, also be designated lever arms which, at their sections facing away from the pivot device 3, display handle members about which the user of the press grasps during a pressing operation.

Figure 3:
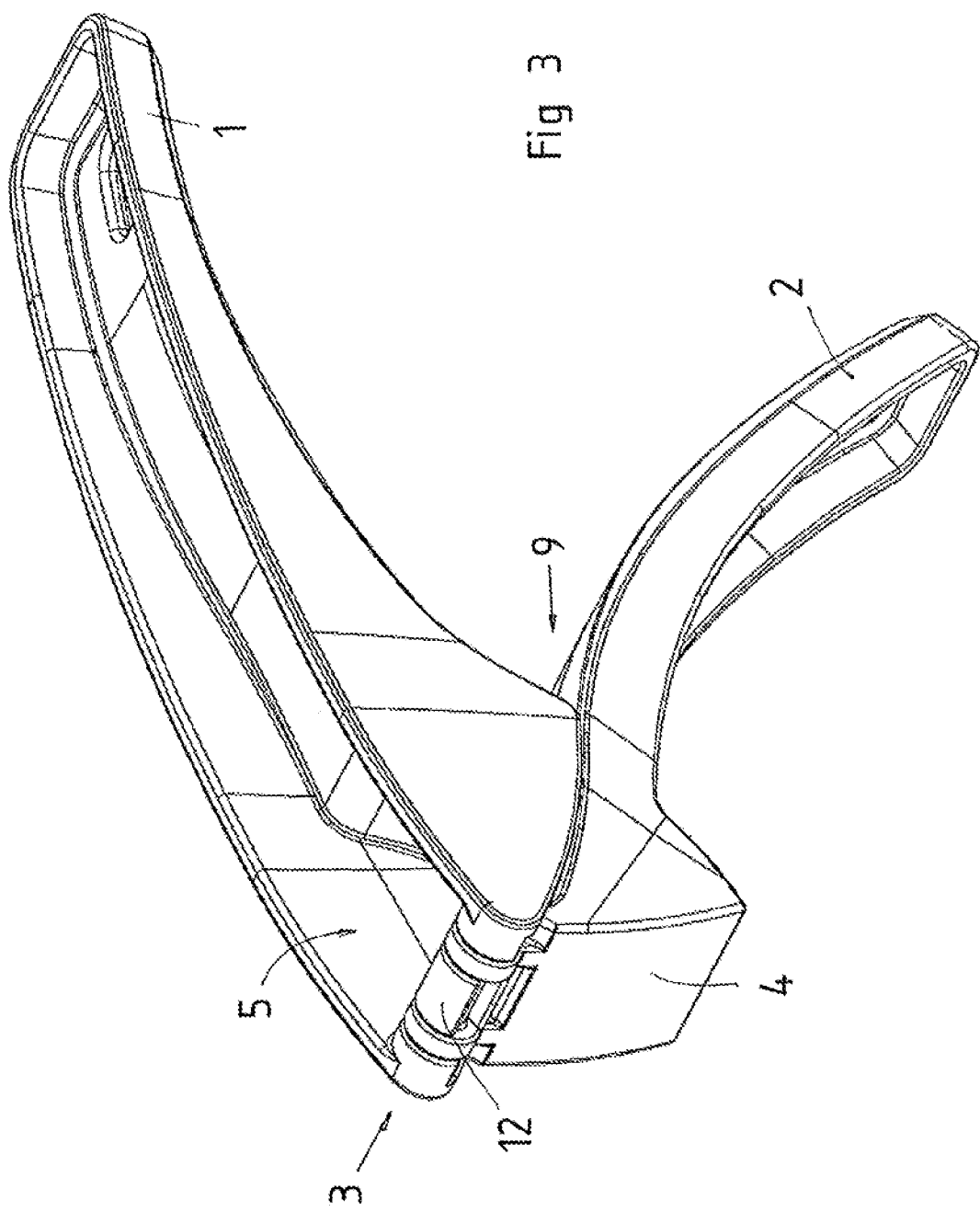
FIG. 3 shows the food press in a position where an upper or second portion has been pivoted approximately three quarters of a revolution in a counterclockwise direction in relation to the position as shown in Fig.

It will be apparent from FIG. 3, which shows the food press according to FIGS. 1 and 2 in a position where the upper portion 2 has been pivoted in a counterclockwise direction by means of the pivot device 3 approximately three quarters of a turn compared with the position according to FIGS. 1 and 2, that the upper portion 2 has a press plate 4, while the lower portion I defines an accommodation space 5 for the material which is to be pressed. On pivoting of the upper portion 2 in a clockwise direction, from the position illustrated in FIG. 3 to the position illustrated in FIGS. 1 and 2, the press plate 4 will be moved down into the accommodation space 5 and exercise pressure on the material which is located therein.

It will be apparent from FIG. 2 that the accommodation space 5 is, at its bottom, defined by a comminutor unit 6 which, in the illustrated embodiment, is designed as a grid.

Thus far, the food press as described above may be considered as traditional.

It will be apparent from FIG. 1 that, on the upper portion 2 of the food press, there is disposed a cleaning device 7 with a number of projections 8 which, in the illustrated embodiment, are designed as pins which fit into corresponding apertures in the comminutor unit or the grid 6. By pivoting the upper portion 2 of the food press from the position illustrated in FIG. 1 to the position illustrated in FIG. 3, hence in a counterclockwise direction, it is possible to insert the pins 8 through the apertures which are disposed in the grid 6. In such instance, the pins 8 are of a length which corresponds to or slightly exceeds the thickness of the grid 6, whereby material which may possibly have remained in the apertures of the grid is pressed out in order to be easily removed. According to the present invention, the comminutor unit 6 is, at its outer end, secured in the food press, on the one hand via a second pivot 17 included in the pivot device 3 and, on the other hand, at the opposing, inner end, via a first pivot 9 which connects the comminutor unit 6 with the lower portion or lever arm 1 of the food press. As will be apparent from FIG. 4, the pivot device 3 is designed in such a manner that the outer end of the comminutor unit 6 and the corresponding end of the second portion 2 of the food press pivotally interconnected therewith are releasable from the outer end of the first portion 1 of the food press. On the other hand, in the embodiment illustrated on the Drawings, the second pivot 17 is not openable.

The pivoting feature between the comminutor unit 6 and the second portion 2 of the food press amounts to the order of magnitude of 180° or more. Correspondingly, the pivoting feature between the inner end of the comminutor unit 6 and the first portion of the food press also amounts to the order of magnitude of 180°. From this. and from FIG. 4, it follows that the different components included in the food press may be brought to a position where the interior of the accommodation space 5 is completely freely accessible, where both sides of the comminutor unit 6 are accessible and where both the press plate 4 and the cleaning device 7 are readily accessible for cleaning.

Figure 5:
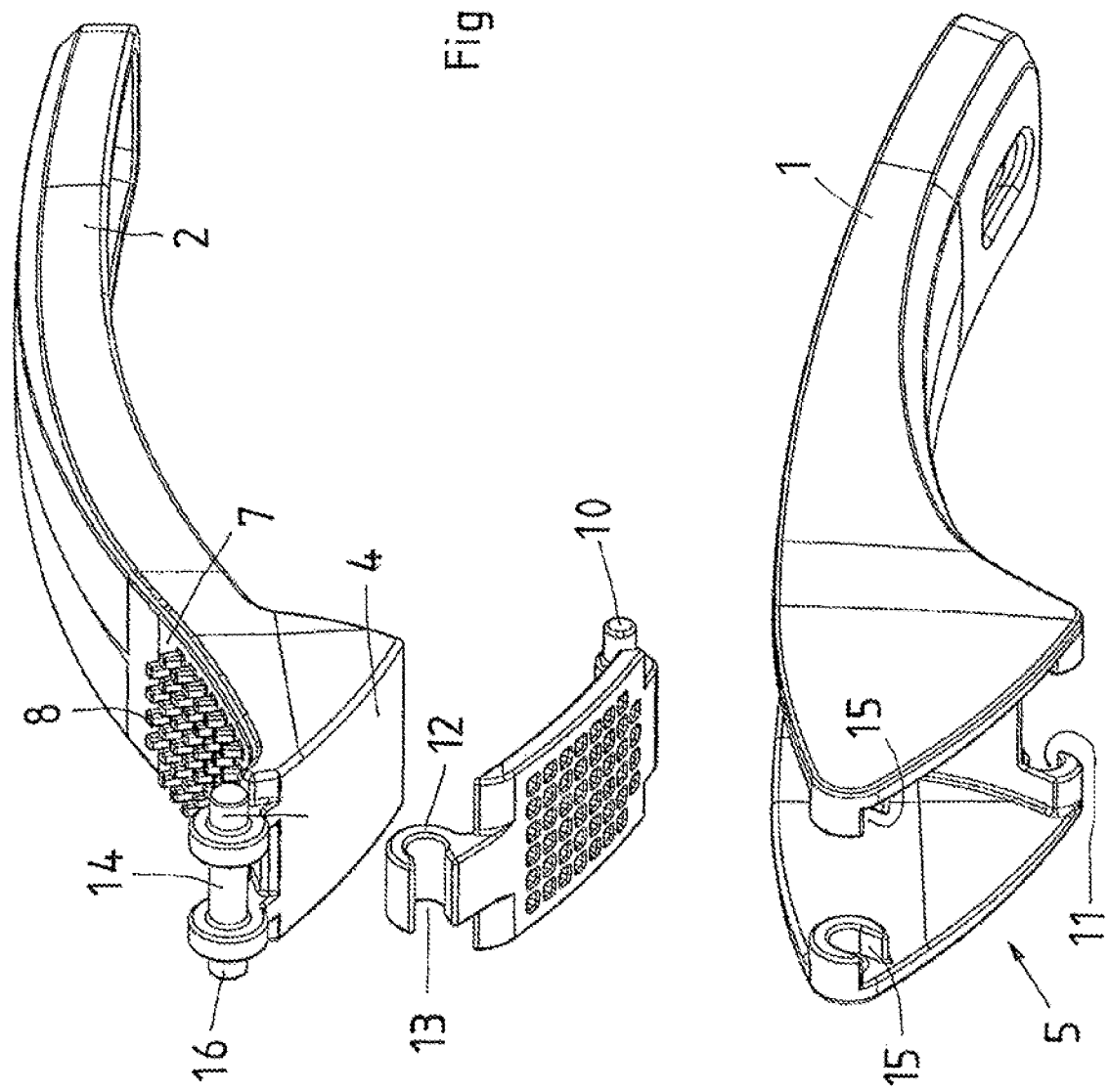
FIG. 5 is an exploded view of the components included in the food press in a position corresponding to FIG. 1.

As is apparent from FIG. 5, the first pivot 9 is designed in such a manner that, at the inner end of the comminutor unit 6, there are disposed two laterally projecting pins 10 (only one of them is shown in the Figure). These pins 10 are in alignment with one another and are circular in cross section and may be snapped into inner journaling spaces 11 disposed on the first portion 1 of the food press at the inner end of the accommodation space 5. The journaling spaces 11 are clawlike and slightly undercut so that the pins 10 do not run the risk of falling out therefrom.

At the outer end of the comminutor unit 6, there is disposed an outer journal member 12 with an undercut, partly circular accommodation space 13. The journal member 12 is clawshaped, whereby the accommodation space 13 is slightly undercut but open.

The pivot device 3 further includes a shall 14 disposed on the second portion 2 of the food press, and has a circular cross section. and is also capable of being snapped into the accommodation space 13 of the journal member 12.

The above-considered first pivot 9 thus includes the pins 10 and the journaling spaces 11, while the second pivot 17 includes the shaft 14 and the journal member 12.

The first and second pivot may, in a first embodiment, be permanently united so that after assembly, the parts cannot be separated. In this embodiment, it is also conceivable that the accommodation spaces 11 on the first portion of the food press are cylindrical and that the hinge pin which is defined by the pins 10 is a loose journal shaft insertable in the accommodation spaces in the axial direction. A corresponding arrangement of the second pivot is also conceivable.

The pivot device 3 which per se includes the second pivot 17 fulfils yet a further function, namely of realising the pivot feature between the first and second portions of the food press, but also to permit separation of these parts from one another. In order to realise this feature, the first portion 1 of the food press has, at its outer end, two bushes with open journal spaces 15 disposed therein. The journal spaces are open in a downward direction, i.e. in that direction which is turned to face downwards in the normal position of use of the food press. The journal spaces 15 further display partly circular cross section whereby the openings adjacent the journal spaces are narrower than the diameter of the journal spaces. As a result, the journal spaces will be undercut.

On the outer end of the second portion 2 of the food press, there are disposed, as an extension of the shaft 14, stub shafts 16 which, as opposed to that illustrated in FIG. 5, are not cylindrically shaped but have a cross section displaying a major axis and a minor axis. For example, the shape of the stub shafts 16 may be a circular starting shape where mutually registering and mutually parallel planar surfaces are recessed in the circumferential surfaces of the cylindrical portions. One alternative embodiment may be oval or possibly elliptical.

Figure 4:
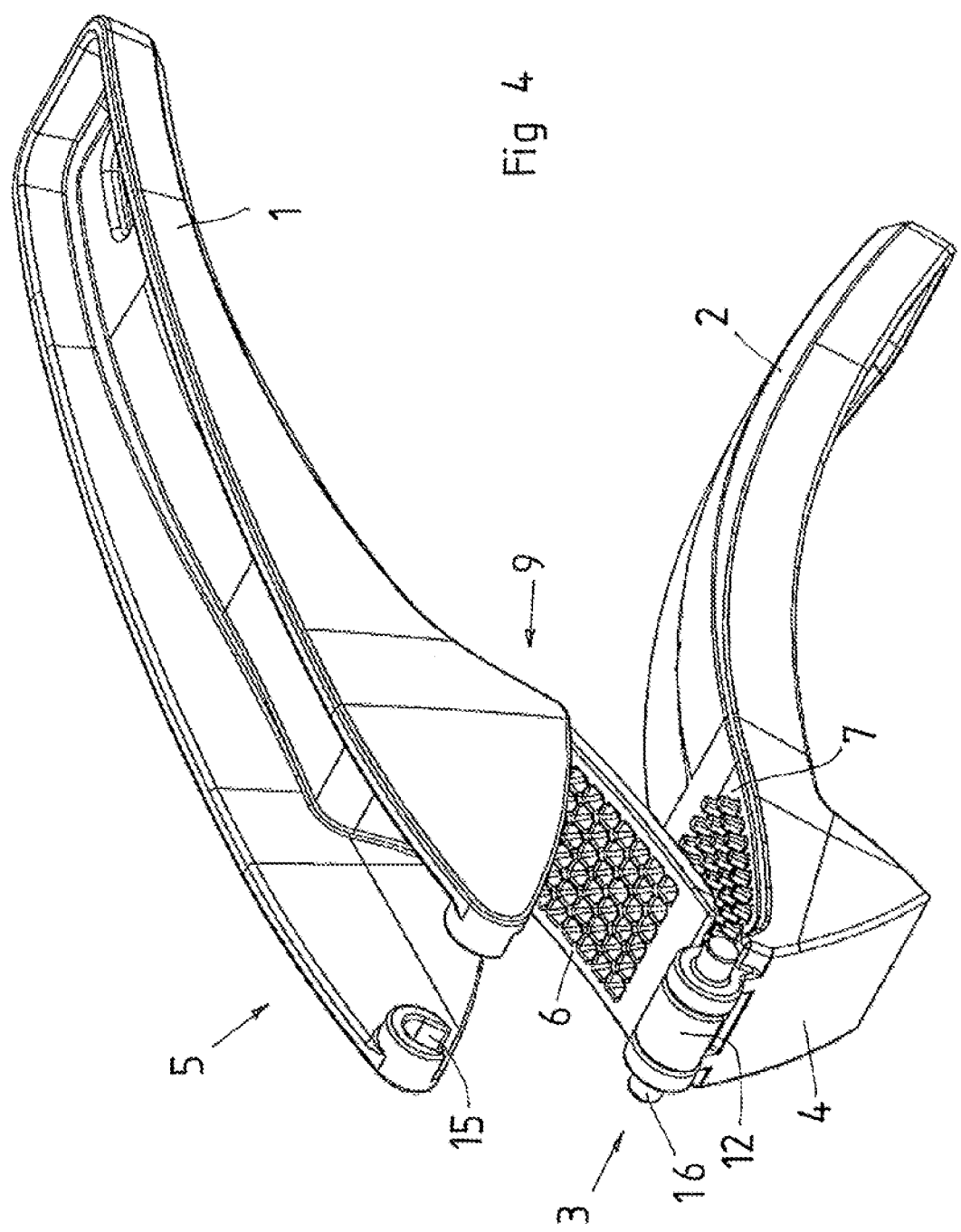
FIG. 4 shows the food press according to FIG. 3 where a comminutor unit included in the food press has, at its one end, been released from the lower or first portion of the food press.

In a position where the first and second portions of the food press extend as each other's extension, in other words approximately in between the positions shown in FIG. 4 and FIG. 1. the major axes of the stub shafts 16 are oriented substantially in a vertical direction. In this position, the openings of the journal spaces 15 are turned to face downwards. This implies that, in this position, the stub shafts 16 may be moved into and out of the journal spaces 15.

On rotation of the upper portion 2 of the food press from the above-described position in a clockwise direction. in other word towards the pressing position, the stub shafts 16 are turned so that their major axes become transversely directed in relation to the openings into the journal spaces 15. In this position, the stub shafts 16 can no longer be removed from or inserted in the journal spaces 15.

It will further be apparent from FIG. 5 that both the comminutor unit 6 and the press plate 4 are arched about an axis which is parallel with the shalt 14.

Figure 6:
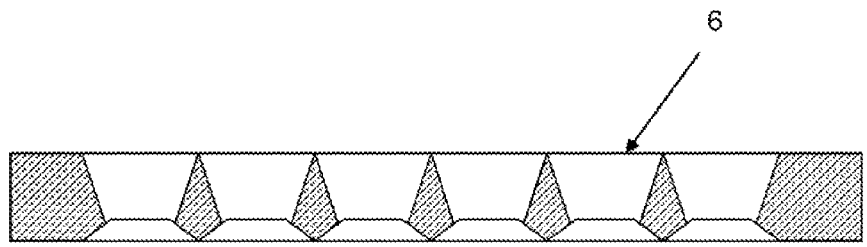
FIG. 6 is a partially cross-sectional view of a comminuter unit according to an aspect of the present invention.

The comminutor unit 6 may, as seen in FIG. 6, be designed with a number of through-going apertures which, on that side facing towards the press plate 4 on use, have sharp edges which act as cutting edges. In the pressing direction, i.e. away from the cutting edges, the through-going apertures widen somewhat in order thereby to make possible release of the food which is pressed through the apertures.

The embodiment of the food press illustrated in the Drawings is principally intended as a garlic press and, as a result, is in practice dimensioned approximately on the same scale as the Drawings.

For example, the material in the food press is a plastic material or a metal which is suitable for contact with foods. In certain variations of the press, the two materials are combined with one another. In one embodiment, the comminutor unit 6 is manufactured from metal, while the remaining parts are manufactured from plastics.

However, the subject matter of the present invention may readily be modified principally in such a manner that the accommodation space 5 and the press plate 4 are made considerably larger so that the accommodation space may simply accommodate considerably larger pieces of food. for example boiled potatoes. In such an embodiment, the food press is suitable as a potato press.

Figure 7:
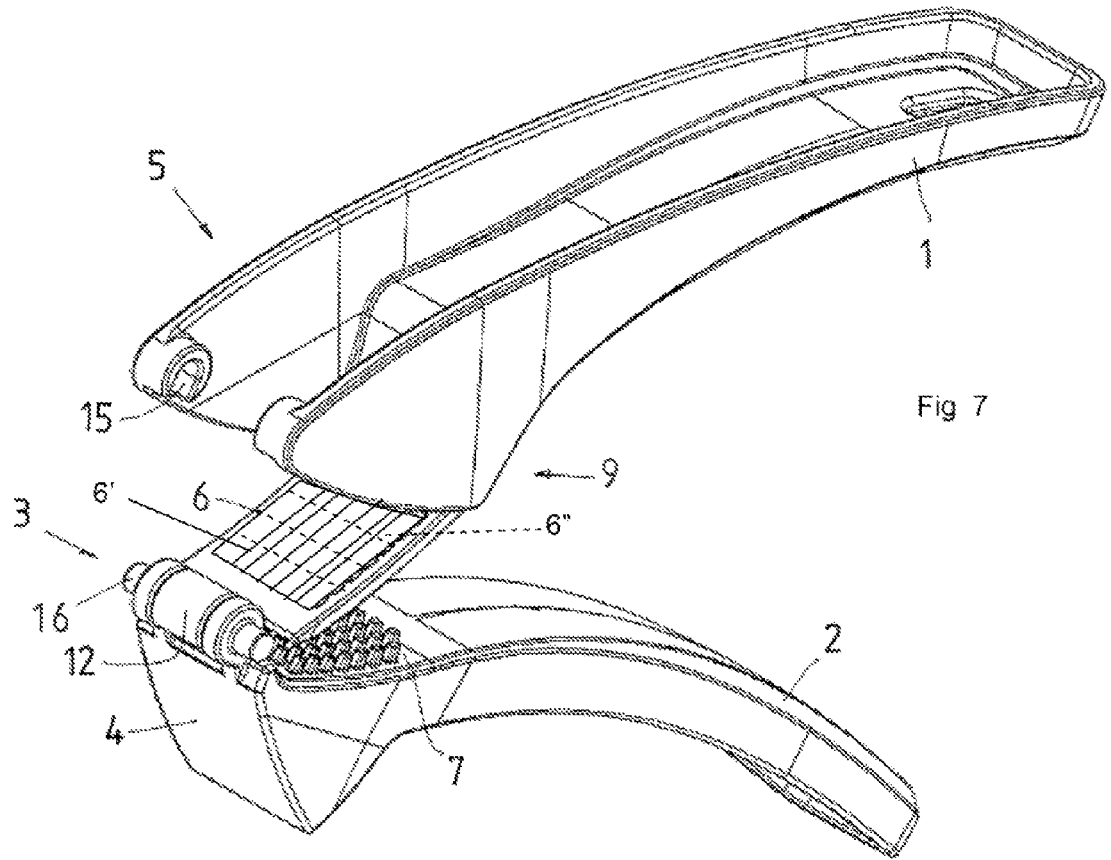
FIG. 7 shows a food press according to further aspects of the present invention.

If the first 9 and second 17 pivots of the food press are made openable so that the comminutor unit 6 will be replaceable, it is possible according to the present invention, to design the comminutor unit 6 with a number of parallel knives 6' as seen in FIG. 7, whereby the food press according to the present invention will become suitable for slicing foods. Further, it is possible according to the present invention, to design the comminutor unit 6 with a number of mutually intersecting knives, as seen by the knives 6' and the knives 6" shown in phantom in FIG. 7, whereby the food press according to the present invention will become well suitable for cutting food sticks, for example potatoes. In such embodiments, it is thus possible to use a plurality of alternative comminutor units for one and the same food press.

What is claimed is:

1. A food press comprising
   a first portion with a first handle and an accommodation space for food which is to be pressed,
   a second portion with a second handle and a press plate, and
   a comminutor unit through which the food is pressed in a first direction out of the accommodation space by the press plate,
   the comminutor unit being pivotally connected to the first portion via a first pivot and to the second portion via a second pivot,
   wherein the first portion is pivotally connected to the second portion via a pivot device and the pivot device includes journal spaces fixedly disposed on the first portion of the food press and in which are pivotally mountable stub shafts which are disposed on the second portion of the food press, and the journal spaces have radially directed apertures through which the stub shafts may be inserted in a second direction generally opposite the first direction and withdrawn in the first direction.

2. The food press as claimed in claim 1. wherein the first and the second pivots are located at opposing ends of the comminutor unit.

3. The food press as claimed in claim 1, wherein the comminutor unit is permanently interconnected with the first portion of the food press via the first pivot.

4. The food press as claimed in claim 1, wherein the interconnection between the comminutor unit and the second portion of the food press via the second pivot is permanent.

5. The food press as claimed in claim 1, wherein the comminutor unit includes a perforated plate through whose apertures the food is intended to be pressed.

6. The food press as claimed in claim 5, wherein the apertures have sharp edges and that the cross sections of the apertures widen in a pressing direction.

7. The food press as claimed in claim 5, wherein the food press is designed for pressing garlic or alternatively tubers.

8. The food press as claimed in claim 1, wherein the comminutor unit includes a number of mutually parallel disposed knives for slicing the food.

9. The food press as claimed in claim 1, wherein the comminutor unit includes a number of mutually intersecting knives for cutting the food into sticks.

10. A food press comprising a first portion with a first handle and an accommodation space for food which is to be pressed, a second portion with a second handle and a press plate and a comminutor unit through which the food is pressed, the comminutor unit being pivotally connected to the first portion via a first pivot and to the second portion via a second pivot, wherein the first, portion is pivotally connected to the second portion via a pivot device, wherein there is disposed, on the second portion of the food press, a cleaning device with a number of pins or projections which, after pivoting of the second portion of the food press to its maximum in an opening direction, are movable into cleaning cooperation with the comminutor unit in a direction which is opposite to that of a pressing direction.

11. The food press as claimed in claim 1, wherein the pivot device and the second pivot are coaxial.

12. The food press as claimed in claim 1, wherein the comminuter unit is directly pivotally connected to the second portion by the second pivot.

13. The food press as claimed in claim 1, wherein the second portion includes a concave surface facing outwardly on the second handle opposite the press plate and adapted to be disposed adjacent an outer surface of the comminutor unit when the second portion is pivotably connected to the first portion via the pivot device.

14. The food press as claimed in claim 13, wherein the comminutor unit comprises a concave surface fixing the accommodation space and a convex surface facing away from the accommodation space, and the concave surface on the second portion has a shape matching and arranged to contact the convex surface of the comminutor unit.

15. The food press as claimed in claim 14, wherein the comminutor unit comprises a plurality of openings extending through the comminutor unit through which food is to be pressed, and the second portion comprises a plurality of protrusions on the concave surface arranged to extend through the plurality of openings when the concave surface is moved into contact with the convex surface of the comminutor unit.

16. The food press as claimed in claim 1, wherein the radially directed apertures of the journal spaces of the pivot device through are narrower than a diameter of the journal spaces.

* * * * *